United States Patent [19]

Wittersheim

[11] Patent Number: 4,979,723

[45] Date of Patent: Dec. 25, 1990

[54] FLUID POWERED WHEEL LIFT PLATFORM

[75] Inventor: Donald W. Wittersheim, Dearborn, Mich.

[73] Assignee: Ford Motor Company, Dearborn, Mich.

[21] Appl. No.: 415,941

[22] Filed: Sep. 27, 1989

[51] Int. Cl.[5] .......... B60P 1/48

[52] U.S. Cl. .......... 254/124

[58] Field of Search .......... 254/2 B, 8 B, 9 B, 10 B, 254/93 R, 93 M, 124, 126; 92/13.6; 414/428, 427, 426

[56] References Cited

U.S. PATENT DOCUMENTS

| | | | |
|---|---|---|---|
| 2,497,960 | 2/1950 | Salzmann . | |
| 2,506,081 | 5/1950 | Hanrahan . | |
| 2,556,796 | 6/1951 | Care et al. . | |
| 3,223,251 | 12/1965 | Rothe et al. . | |
| 3,299,827 | 1/1967 | Ferrari et al. | 92/13.6 |
| 3,664,635 | 5/1972 | Kincaid | 254/8 B |
| 3,883,105 | 5/1975 | Matsumoto | 254/124 |
| 4,088,303 | 5/1978 | Aquila . | |
| 4,238,003 | 12/1980 | Hunter . | |
| 4,248,405 | 2/1981 | Kameda | 254/10 B |
| 4,460,158 | 7/1984 | Chiesa et al. | 254/124 |
| 4,486,936 | 12/1984 | Curry | 254/124 |
| 4,555,089 | 11/1985 | Eck . | |
| 4,801,237 | 1/1989 | Yamamoto | 414/428 |

FOREIGN PATENT DOCUMENTS

| | | | |
|---|---|---|---|
| 1072049 | 9/1954 | France | 414/428 |

*Primary Examiner*—Robert C. Watson

*Attorney, Agent, or Firm*—Daniel M. Stock; Roger L. May

[57] ABSTRACT

A lift mechanism is provided for lifting vehicle wheels in horizontal orientation through use of a fluid actuator driven parallelogram linkage. The fluid actuator includes an adjustabale stop for setting the extent of the wheel lift travel below a fixed amount set by a stop carried between the linkage and the actuator.

5 Claims, 2 Drawing Sheets

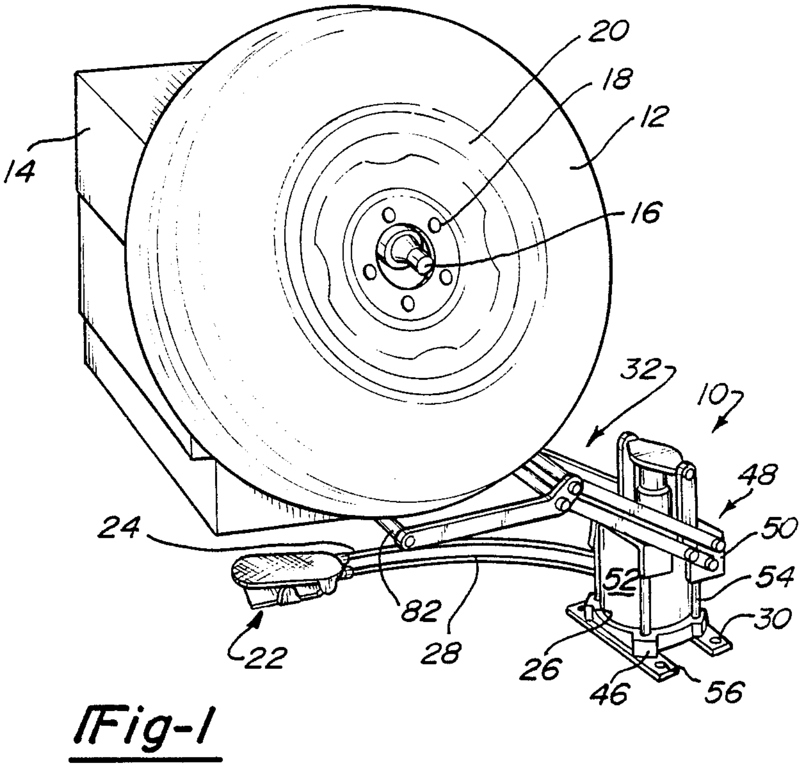
/Fig-1
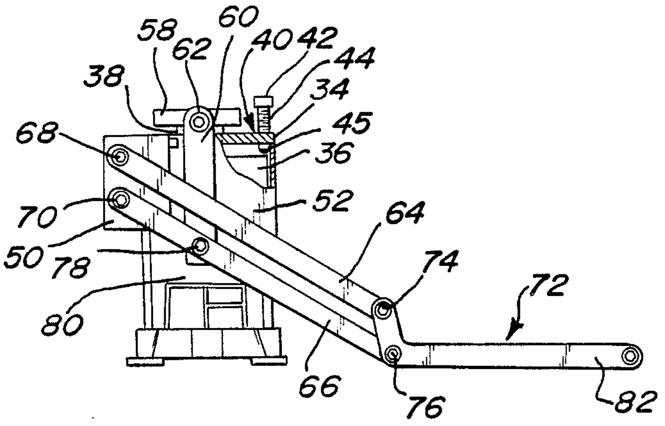
/Fig-2

FLUID POWERED WHEEL LIFT PLATFORM

BACKGROUND OF THE INVENTION

The present invention relates generally to wheel lift mechanisms and more particularly to a compact wheel lift mechanism for effecting the lifting of automotive vehicle wheels through the agency of fluid power.

DESCRIPTION OF THE PRIOR ART

In the repair and testing of automotive vehicles, the handling of vehicle wheels separately from the vehicles themselves is a regularly repetitive task. When the vehicles that are being repaired or tested are of larger sizes, such as trucks or recreational or utility vehicles, the weight of such vehicle wheels makes the handling difficult and cumbersome, and therefore disadvantageously time consuming. One example of the type of task involved in the repair and testing of such vehicles is the relatively common task of wheel balancing. Positioning a vehicle wheel with respect to a wheel balancing machine at the position in which the wheel is spaced vertically from the ground and is in alignment with a rotary spindle of the wheel balancing machine can often be a multiple person task.

While power tools of many types for lifting entire vehicles themselves are readily available in facilities dedicated to the repair and testing of vehicles, the manipulation of vehicle wheels for purposes such as the wheel balancing task mentioned has remained a manual labor tasks. Certainly vehicle jacks are well known in the prior art. For example, U.S. Pat. No. 4,088,303 to Aquila discloses a lift apparatus for accommodating an entire small vehicle, lifting it from a floor on which it is positioned to some elevated position. Also known are vehicle lift devices of the type shown in U.S. Pat. No. 4,555,089 to Eck, which provide for a fluid power-driven carriage for lifting a vehicle through engagement with its wheels. Devices of the sort of the exemplary patents have been found to be overly massive and expensive for use in facilitating the position of vehicle wheels with respect to vehicles in testing machinery therefor. They suffer from the further disadvantage that they are not accurately adjustable as to the limitations on their lifting movements in the upward direction, making their use for positioning a wheel, as is contemplated in the lift mechanism of the present invention, laborious and time consuming.

SUMMARY OF THE INVENTION

Responsive to the disadvantages of the prior art, it is an object of the present invention to provide a wheel lift mechanism of simple and lightweight construction.

It is a further object of the present invention to provide such a wheel lift mechanism that provides for adjustability of the lifting movement of the mechanism in lifting a vehicle wheel from the floor to an elevated position.

According to a feature of the present invention, a wheel lift mechanism is provided which includes a source of pressurized fluid, and a fluid actuator in communication with the source of the pressurized fluid and operatively connected to a platform for carrying the vehicle wheel through a linkage for effecting parallel movement of the platform with respect to the actuator.

According to another feature of the present invention, the wheel lift mechanism includes an adjustable means for limiting the travel of the actuator in at least one direction.

According to yet another feature of the present invention, a stop mechanism is provided for limiting upward travel of the linkage.

BRIEF DESCRIPTION OF THE DRAWINGS

These and other objects and features of the invention will become apparent to those skilled in the vehicle repair and testing arts upon reading the following description with reference to the accompanying drawings in which:

FIG. 1 is a perspective view of a wheel lift mechanism according to the present invention during the process of its lifting a vehicle wheel for installation on a wheel balancing machine;

FIG. 2 is a side view of a wheel lift mechanism of the present invention;

DESCRIPTION OF THE PREFERRED EMBODIMENT

Figure 3:
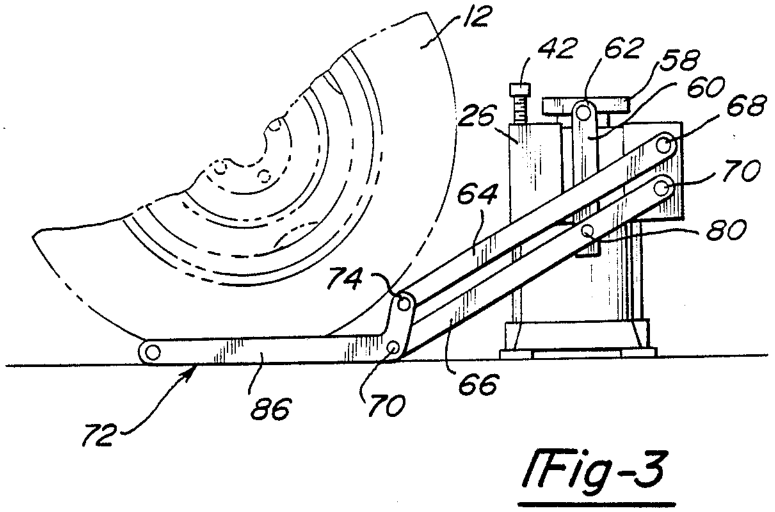
FIG. 3 is a side view similar to FIG. 2 showing engagement of the mechanism with a vehicle wheel for lifting.

Turning now to the drawings and in particular to FIG. 1 thereof, the wheel lift mechanism of the present invention indicated generally at 10 is illustrated in an appropriate working environment in which it is positioned to effect lifting and lowering movement of a vehicle wheel 12 with respect to a wheel balancing machine 14, which includes a rotary spindle 16. In using the wheel balancing machine 14, the wheel 12 must be mounted in surrounding relationship with respect to the spindle 16 through conventional fastening means, such as the provision of studs (not shown) projecting through mounting holes 18 formed through the rim 20 of the wheel 12. It will be appreciated that this mounting task is essentially identical to that encountered in changing a vehicle's tire. In cases in which the wheel 12 is relatively massive, being of greater size than that encountered in standard passenger vehicles (including, for example, light, medium and heavy truck tires), aligning the wheel 12 for proper insertion of the studs through the mounting holes 18 is a laborious and time-consuming task.

The task may be made far less laborious by use of the lift mechanism 10 of the present invention. The lift mechanism 10 is illustrated as generally comprising a foot operated valve 22 connected by a suitable conduit 24 to a source (not shown) of pressurized fluid, such as air, a fluid actuator, such as a piston and cylinder assembly 26, in fluid communication through a conduit 28 with the valve 22, a mounting carriage 30 supporting the piston cylinder assembly 26 and a lift linkage assembly 32 operatively carried between the carriage 30 and the piston and cylinder assembly 26 for effecting lifting and lowering of the vehicle wheel 12.

A detailed description of the foot operated valve 22 is not deemed necessary since a wide variety of such valves are commercially available and, for purposes of practicing the present invention, it is only necessary that a valve be provided that selectively communicates fluid under pressure from the source of pressurized fluid to the piston and cylinder assembly 26 and exhausts pressurized fluid from the piston cylinder assembly 26 to an unpressurized reservoir, such as the atmosphere in the case of a pneumatic system. It has been found particularly advantageous, however, to practice the present invention through the use of such a valve whose operation may be selected and manipulated by use of the foot to leave an operator's hands free in positioning the wheel 12 with respect to whatever structure is chosen for mounting. In the working environment shown, this would be the wheel balancing machine 14. However, it is clearly possible to use the wheel lift mechanism 10 to position to wheel 12 with respect to the wheel spindle of the vehicle itself and other elevated positioning tasks might also be facilitated by the use of the wheel lift mechanism 10.

The piston and cylinder assembly 26 is illustrated as comprising a cylinder housing 34 which telescopically receives a piston 36. A piston rod 38 is fixedly secured to the piston 36 and necessarily extends outwardly from an upper surface 40 of the cylinder housing 34. Details of construction of the piston and cylinder assembly 26 are unnecessary to the understanding of the practice of the present invention beyond the necessity that the communication of the source of pressurized fluid with the piston cylinder assembly 26 must be operative to move the piston 36 with respect to the housing 34 to extend the piston rod 38 upwardly above the upper surface 40 of the cylinder housing 34.

An adjusting screw 42 sealed in a known manner extends through the upper wall 44 of the housing 34 so that its bottom surface 45 may be adjustably positioned to abuttingly engage the piston 36 in its uppermost position. This limits the vertical travel of the piston 36 and, consequently, the piston rod 38 fixedly secured to it so that an upward lifting movement of the lift mechanism 10 can be limited. This facilitates accurate positioning of the wheel 12 with respect to the elevated surface upon which it is desired that the wheel 12 be mounted. Lowering the wheel 12 may be accomplished through agency of the valve 22 by severing communication between the source of pressurized fluid and the piston cylinder assembly 26 and establishing communication between the piston cylinder 26 and the low pressure reservoir.

The carriage assembly 30 is illustrated as comprising a base plate 46 and a cap portion 48 fixed to the bottom and top of the piston cylinder assembly 26, respectively. The cap portion 48 is illustrated as comprising a pair of generally U-shaped mounting plates 50, 52 which are joined to respective sides of the mounting plate 46 through a plurality of mounting screws indicated generally at 54 extending the length of the piston and cylinder assembly 26. A plurality of mounting holes 56 are provided in the base plate 46 for effecting secure anchoring of the lift mechanism 10 to a support structure, such as a work floor, in situations where that is deemed necessary, to provide reaction surfaces for loads generated during the lifting of the vehicle wheel 12.

The lift link assembly 32 simply and advantageously provides for the conversion of the vertical movement to the piston 36 of the piston cylinder assembly 26 to movement stably lifting and accurately positioning the vehicle wheel 12 in a horizontal orientation. The lift link assembly 32 is illustrated as including a support plate 58 fixedly secured to the outer end of the piston rod 38. It also includes a drive link 60 pivotally mounted at 62 to the plate 58 and suspended between the plates 50, 52, a pair of lift links 64, 66 pivotally mounted outboard of the link 60, as indicated at 68, 70 respectively, to the plate 50, and a platform 72 pivotally mounted as indicated at 74, 76 to the lift links 64, 66, respectively. The lift links 64, 66 are vertically spaced and extend in parallel fashion. The lower lift link 66 is pivotally mounted as indicated at 78 to the lower end 80 of the drive link 60.

The platform 72 is formed, as may best be seen in FIGS. 1 and 2, as an open, generally L-shaped cradle having cross members, indicated generally at 82, of circular cross-section and having side bars 84, 86 for laterally supporting the vehicle wheel 12. As can best be seen in FIG. 1, the drive link 60 and the lift link 64, 66 likewise are formed as space pairs of identical links for lateral balance and support, each of the laterally spaced pairs of links functioning as a single link within the meaning of the description of the mechanical movement of the lift mechanism 10.

Figure 4:
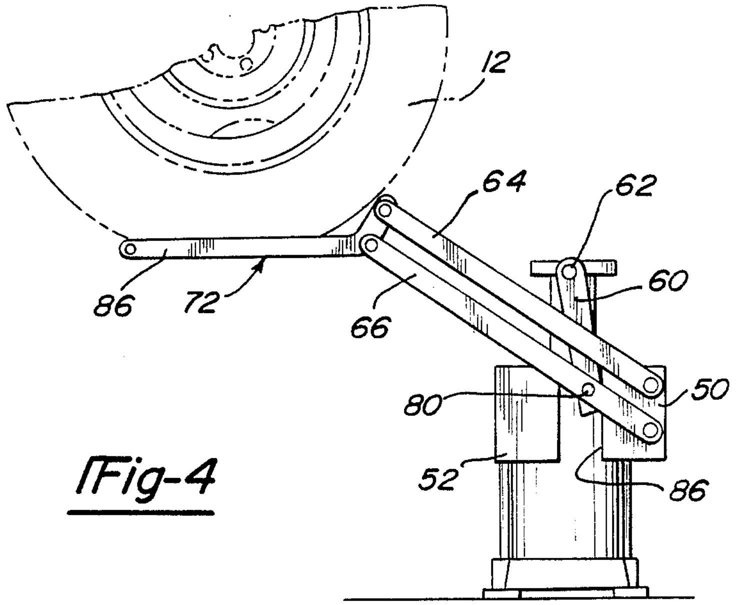
FIG. 4 is a view showing the position of the components of the wheel lift mechanism upon lifting the vehicle wheel.

In the preferred embodiment illustrated, the length of the lift links 64, 66 and the positioning of the pivotal connections of those links are chosen to position the side bars 84, 86 of the platform 72 horizontally. As can best be seen in FIGS. 2 and 3, the platform 72 may be horizontally positioned on a floor or other surface below the wheel 12, and when pressurized fluid is applied to the piston and cylinder assembly 26, the piston rod 38 extends upwardly, as shown in FIG. 4, so that the drive link 60, which is suspended from the plate 58 is drawn upwardly, effecting pivotal movement of the lower link 66 about its pivotal connection 70 with cap 50. Because of the pivotal connections 68 and 74 of the upper link 64 to the cap 50 and the platform 72, the upper link 64 is free to follow this pivotal movement in parallel fashion, providing for increased support in effecting the horizontal movement of the platform 72 as the vehicle 12 is moved upwardly into its mounting position. The pivotal freedom of the link 60, both with respect to the cap 58 and the lower link 66, as may best be seen by comparison of FIGS. 3 and 4, permits this maintaining of the horizontal orientation of the platform 72. Furthermore, even absent the limiting of vertical movement by operator of the adjusting screw 42, such travel is conveniently ultimately limited by abutment of the drive link 60 against the facing surface 86 of the plate 50, as may best be seen in FIG. 4.

While only one embodiment of the lift mechanism of the present invention has been described, others may be possible without departing from the scope of the appended claims.

What is claimed is:

1. A wheel lift mechanism for an automotive vehicle wheel having an actuator having a vertically movable number; a platform horizontally positionable to support said vehicle wheel; and linkage means operatively connected to said vertically movable member for effecting parallel movement of said platform with respect to said vertically movable member, said linkage means comprising:

bracket means fixed to said actuator;

elongated drive link means pivotally mounted at one end on one end of said vertically movable member; and a pair of ellongated lift links, each being pivotally connected to said platform and to said bracket and extending in parallel fashion therebetween and one of said lift links being pivotally connected to the other end of said drive link.

2. A wheel lift assembly as defined in claim 1 and further comprising adjustable means for limiting the travel of said vertically movable member in at least one direction.

3. A wheel lift assembly as defined in claim 2, wherein said adjustable means comprises an adjusting screw threadedly engaged with said actuator to a position abuttingly engagable with a portion of said vertically movable member.

4. A wheel lift mechanism as defined in claim 1 and further comprising fixed stop means carried with said actuator and engageable with said linkage means for limiting the travel of said linkage means in at least one direction.

5. A wheel lift mechanism as defined in claim 4 and further comprising fixed stop means carried with said bracket means and engageable with said linkage means for limiting the travel of said linkage means in at least one direction.

* * * * *